United States Patent [19]
Higuchi

[11] Patent Number: 5,754,045
[45] Date of Patent: May 19, 1998

[54] POWER LINE SWITCHING APPARATUS

[75] Inventor: Takemitsu Higuchi, Osaka, Japan

[73] Assignees: The Kansai Electric Power Co., Inc.; Kansai Tech Corporation, both of Osaka, Japan

[21] Appl. No.: 924,338

[22] Filed: Sep. 5, 1997

Related U.S. Application Data

[63] Continuation of Ser. No. 703,612, Aug. 27, 1996, abandoned.

[30] Foreign Application Priority Data

Aug. 31, 1995 [JP] Japan ........................ 7-224201

[51] Int. Cl.$^6$ .................. G05B 24/02; G05F 1/10; H02H 7/125
[52] U.S. Cl. .................. 323/320; 323/237; 363/54
[58] Field of Search ................. 323/320, 324, 323/234, 237, 239; 363/54

[56] References Cited

U.S. PATENT DOCUMENTS

| | | | |
|---|---|---|---|
| 3,731,183 | 5/1973 | Johnson et al. | 323/128 |
| 4,234,917 | 11/1980 | Suzuki et al. | 363/54 |
| 4,282,568 | 8/1981 | Kobayashi et al. | 363/54 |
| 4,463,406 | 7/1984 | Sirel | 361/56 |
| 4,539,617 | 9/1985 | Delaney et al. | 323/230 |
| 4,636,932 | 1/1987 | Kurosawa et al. | 363/54 |

*Primary Examiner*—Robert Nappi
*Assistant Examiner*—Bao Q. Vu
*Attorney, Agent, or Firm*—Panitch Schwarze Jacobs & Nadel, P.C.

[57] ABSTRACT

A semiconductor switching circuit using semiconductor devices includes steep front wave thyristors which are connected in parallel and inverse with each other in their forward directions. An inductor is connected in series between a power source and the semiconductor switching circuit. The semiconductor switching circuit has an instant disconnection time of 100 to 1000 microseconds.

7 Claims, 5 Drawing Sheets

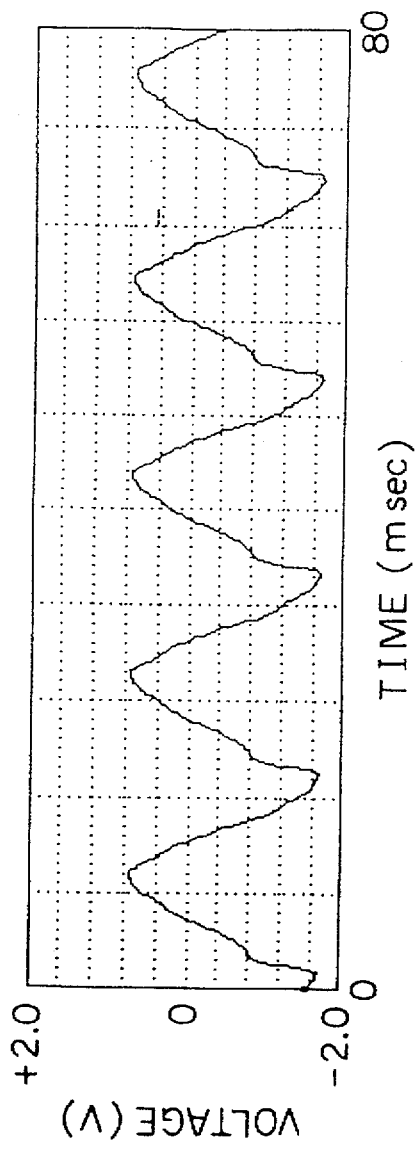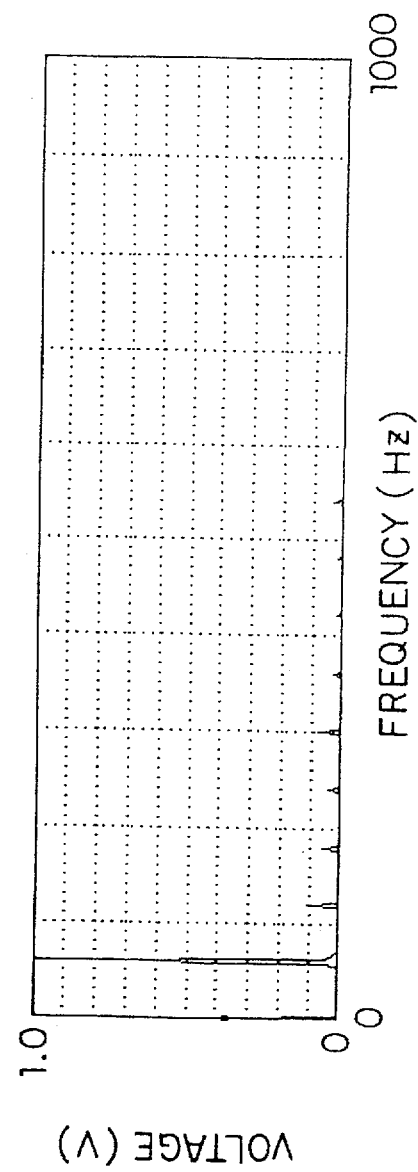
FIG. 3A
FIG. 3B

POWER LINE SWITCHING APPARATUS

This application is a continuation of U.S. patent application No. 08/703,612 filed Aug. 27, 1996, now abandoned.

FIELD OF THE INVENTION AND RELATED ART STATEMENT

BACKGROUND OF THE INVENTION

1. Field of the Invention

The present invention relates to an improvement of a power line instant switching apparatus used to prevent service interruption of power in a power transmission and distribution installation.

FIG. 4 shows a prior art circuit of a power line instant switching apparatus. Referring to FIG. 4, a switching circuit 1 comprises a semiconductor switching circuit 2 and a gas insulation circuit breaker GCB which are connected in parallel with each other. The semiconductor switching circuit 2 comprises a pair of thyristors Th connected in parallel and inverse in their forward directions with each other, a series connected resistor Rd and capacitor Cs which are connected in parallel with the thyristors Th, and a resistor Rp connected in parallel with the thyristors Th. The above-mentioned circuit comprising resistors Rd and Rp and the capacitor Cs is known as a snubber circuit. The snubber circuit serves to protect the thyristors Th by absorbing a transient surge voltage when the transient surge impulse voltage is applied to the thyristors Th.

In a conventional three-phase power transmission and distribution line as shown in FIG. 4, the above-mentioned switching circuit 1 is connected between a power source 10 (A.C. 6000V, for example) and a terminal 4 to be connected to a load of the power line of each phase.

In a power transmission and distribution circuit, a loop circuit transmission is usually introduced. In the loop circuit transmission, a power line from the power source 10 such as a power plant or a substation to many consumers has the well-known loop configuration. The power line is called a "loop circuit power line" or a "loop power line". Hereafter, the power line is referred to as the "loop power line". Circuit breakers are disposed at predetermined intervals of the loop power line, and the loop power line can be disconnected, if necessary. Various types of electrical machinery and apparatus of plural consumers are coupled to a "loop power line section" between two neighboring circuit breakers. When the loop power line is normally operated, electric power is transmitted from the power source 10 to the consumers so as to circulate the loop power line in a predetermined direction.

When the loop power line is defective at a loop power line section existing between neighboring circuit breakers, in order to disconnect the loop power line section from the loop power line, the two neighboring circuit breakers are opened. Subsequently, the electric power is transmitted in both directions to the loop power lines of functioning or failureless areas adjacent to the disconnected defective loop power line section. Consequently, the power transmission in the initial direction is continued to the consumers located on the loop power line which is of upstream from the defective loop power line section. On the other hand, the power transmission is assured to the consumers located on the loop power line downstream from the defective loop power line section by transmitting in the direction opposite the initial direction. Accordingly, the power line instant switching apparatus is activated to form the power line transmitting in the opposite direction to the initial direction. Consequently, the power transmission is held from the power source 10 to the loop power line in the opposite direction, and the power is supplied to the consumers downstream from the defective loop power line section. In this manner, the defective loop power line section is disconnected from the normal loop power line, and the power transmission is held to the normal loop power lines adjacent to the defective loop power line section in both directions. Therefore, malfunction at a part of the loop power line does not influence the power transmission to the consumers on the normal loop power line.

An "interruption time" is defined as a time from interruption of the power transmission of the loop power line by detection of the occurrence of the malfunction to completion of switching operation for transmission in both directions to the normal loop power lines. The interruption time is preferably 10 milliseconds and below, and a desired value is 4 milliseconds and below. When it is 4 milliseconds and below, interruption of electric service can not be sensed by the naked eye. A highly developed electronics apparatus such as a computer is also not influenced by the interruption of the electric service of that order.

The switching circuit 1 in FIG. 4 is used in the power line instant switching apparatus in the prior art. Hereafter, the operation is described in detail.

When a malfunction occurs on a loop power line section of the loop power line and the circuit breakers coupled at both ends of the loop power line section disconnect it, a signal is generated in concurrence with the disconnection of the circuit breakers. The signal is received by a trigger circuit (not shown) and a gate signal is output therefrom. The gate signal is applied to the gates G of the thyristors Th in the switching circuit 1. Consequently, the thyristors Th turn ON and the semiconductor switching circuit 2 is closed, and the power is supplied from the power source 10 to loads of the consumers through the terminal 4. The thyristors Th have forward resistances. If the power is transmitted through the thyristors Th for a long time, the thyristors Th generate heat. For this reason, the gas insulation circuit breakers GCB is closed in concurrence with ON of the thyristors Th. The thyristors Th turn OFF by disconnecting the gate signal after one second, for example, from ON of the thyristors Th. Since the thyristors Th turn ON within several hundreds of microseconds, the power is transmitted to the normal loop power line other than the defective loop power line section in both directions within a short time period of 4 milliseconds and below.

The thyristors Th in the conventional switching circuit 1 as shown in FIG. 4 takes a time period of about 40 to 80 microseconds from a zero cross point at which a polarity of the alternating current changes to its turn-ON. The time length which is taken by the thyristors Th from the zero cross point to the turn-ON is referred to as "instant disconnection time". The semiconductor switching circuit 2 maintains a disconnection state during the instant disconnection time, and does not pass a current. A waveform of current passing through the thyristor Th is different from a sinusoidal waveform due to the instant disconnection time in the vicinity of the zero cross point. Therefore, the waveform of current passing through the semiconductor switching circuit 2 is distorted, and harmonics are generated. The harmonics contain frequencies of two times to several ten times of the fundamental frequency (50 Hz or 60 Hz in Japan). Electric equipment connected to the loop power line is liable to be damaged by the harmonics.

FIG. 5A is a waveform of a current passing through the conventional semiconductor switching circuit 2, and shows a state in which the harmonics are superimposed on the fundamental wave of the sinusoidal waveform of 60 Hz by the above-mentioned waveform distortion. FIG. 5A represents an observed waveform obtained by connecting a measurement resistor (not shown) of a low resistance as replacement for a cable 64 between a terminal 1A and the terminal 4 of the switching circuit 1 and measuring a voltage across the measurement resistor. In the waveform of FIG. 5A, an average voltage level of the waveform is not zero but shifted to a positive voltage. The shift to the positive voltage is caused by an effect described below. A direct current is generated on the power line connected to the switching circuit 1 by induction from other electric equipment located in the vicinity of the switching circuit 1. The direct current passes through the measurement resistor and the shift of the voltage is produced. FIG. 5A shows the distorted waveform of the alternating current passing through the semiconductor switching circuit 2 using the conventional thyristor Th. FIG. 5B is a spectrum analysis diagram of the alternating current shown in FIG. 5A. A fifth harmonic and a ninth harmonic of 0.085V of about 34% of 0.25V of the fundamental wave voltage are contained as shown in FIG. 5B.

As mentioned above, in the semiconductor switching circuit 2 in the prior art, since the instant disconnection time in the vicinity of the zero cross point is relatively short such as 40 to 80 microseconds, the alternating current passing through the semiconductor switching circuit 2 has a large waveform distortion. It is a problem to decrease the waveform distortion.

An object of the present invention is to provide a semiconductor switching circuit which is reduced in waveform distortion in order to solve the above-mentioned problem.

Another object of the present invention is to provide an improved power line switching apparatus by using a semiconductor switching circuit which reduces waveform distortion.

SUMMARY OF THE INVENTION

The power line switching apparatus in accordance with the present invention comprises at least one pair of steep front wave thyristors connected in parallel and inverse in their forward directions with each other, a snubber circuit connected in parallel with the pair of parallel-connected steep front wave thyristors, and an inductor serially connected to the pair of parallel-connected steep front wave thyristors.

The effect of inductance is produced by the instant disconnection time on every half wave by using the steep front wave thyristor, and waveform distortion decreases. Therefore, a harmonic current decreases. Moreover, an impedance of the semiconductor switching circuit with respect to the harmonic current increases owing to an inductance of the serially connected inductor.

According to the present invention, since the instant disconnection time of a semiconductor switching circuit increases in the vicinity of the zero cross point of the alternating current, the waveform distortion of the alternating current greatly decreases. Moreover, the harmonics contained in the output current are suppressed by the inductor connected in series with the semiconductor switching circuit.

BRIEF DESCRIPTION OF THE DRAWINGS

FIG. 3A is a waveform diagram of an alternating current in a switching circuit of the present invention in which an inductor is connected in series with the semiconductor switching circuit using the steep front wave thyristors;

FIG. 3B is a diagram of a frequency spectral distribution of the alternating current in FIG. 3A;

DESCRIPTION OF THE PREFERRED EMBODIMENTS

A preferred embodiment of the present invention is described with reference to FIG. 1 to FIG. 3.

Figure 1:
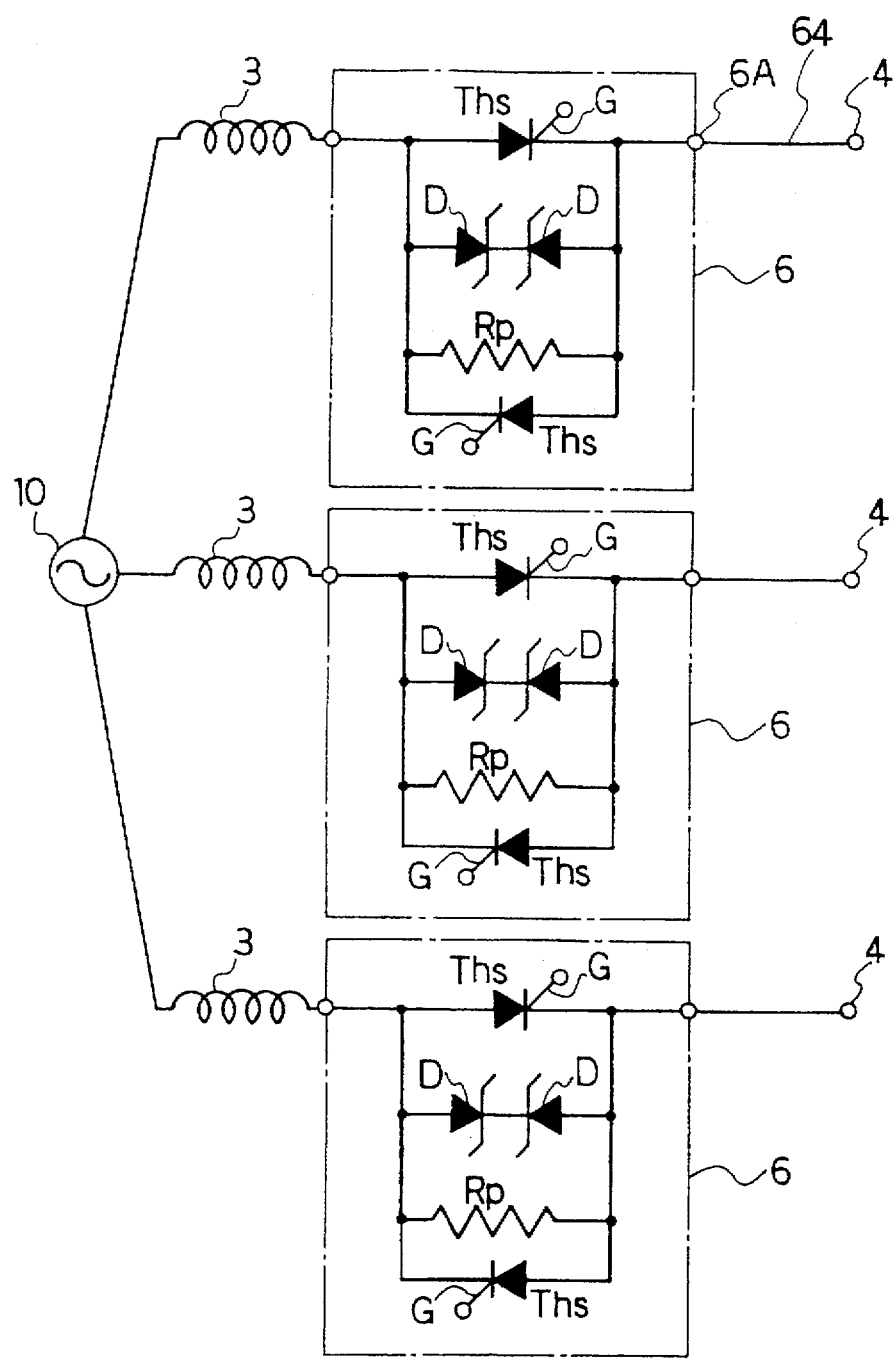
FIG. 1 is a circuit of the power line switching apparatus of an embodiment of the present invention.

FIG. 1 is a circuit of the power line switching apparatus of the embodiment of the present invention. Referring to FIG. 1, a semiconductor switching circuit 6 which serves as a switching circuit is disposed on each of three-phase power lines. Each semiconductor switching circuit 6 comprises a pair of steep front wave thyristors Ths connected in parallel and inverse in their forward directions with each other, a resistor Rp connected in parallel with the steep front wave thyristors Ths and a pair of zener diodes D coupled serially and inverse in their forward direction and connected in parallel with the thyristors Ths. The pair of zener diodes D comprises a snubber circuit, which serves to protect the steep front wave thyristors Ths when a transient surge impulse comes to the thyristors Ths. A spark gap and an arrester may also serve as the snubber circuit and are usable as replacements for the zener diodes D. The resistor Rp serves to equalize divider voltages of the two thyristors Ths. A known instant switching device having an instant disconnection time of 100–1000 microseconds is usable for the snubber circuit.

An inductor 3 is serially connected between the semiconductor switching circuit 6 and a power source 10(A.C. 6000V, for example). The inductance of the inductor 3 is preferably from 20 to 600 mH.

The steep front wave thyristors Ths are made by using semiconductor material wherein a predetermined lattice defect is produced by proton irradiation process with 10 Mev of acceleration voltages. An example of the steep front wave thyristor made by the proton irradiation process is PK-25 HB-160 (1600V, 25 A), which is presently marketed by Sansha Electric Co., Ltd. The instant disconnection time of the semiconductor switching circuit 6 configured by the steep front wave thyristor Ths is 100 to 1000 microseconds.

The power line switching apparatus of the present invention is used for the loop power line as previously discussed in the description of the related art. When a malfunction occurs at a section of the loop power line (hereinafter referred to as loop power line section) and circuit breakers disposed at both ends of the loop power line section disconnect the section from the loop power line, a signal is output by the disconnection operation of the circuit breaker. This signal is received by a trigger circuit (not shown) and a gate signal is output therefrom. The gate signal is a square wave of 5 kHz frequency and 10V of peak value, for example. The gate signal is applied to the gates G of the steep front wave thyristors Ths of the semiconductor switching circuit 6, and the steep front wave thyristors Ths turn ON and the semiconductor switching circuit 6 is closed. Consequently, the power is supplied to the consumers from the power source 10 through the terminal 4.

In the switching apparatus of the embodiment as shown in FIG. 1, the thyristors Ths used in the semiconductor switching circuit 6 have a sufficiently large current capacity with respect to the current of the loop power line. Therefore, the gas insulation circuit breaker GCB installed in the power line instant switching apparatus of the prior art as shown in FIG. 5 is not mounted in the switching apparatus of the embodiment.

In the power line switching apparatus, the rise characteristic of current is improved in the vicinity of the zero cross point of the alternating current and the instant disconnection time is greatly increased as mentioned above. Consequently, the wave distortion decreases and a harmonic current in the current passing through the semiconductor switching circuit also decreases.

Figure 2A:
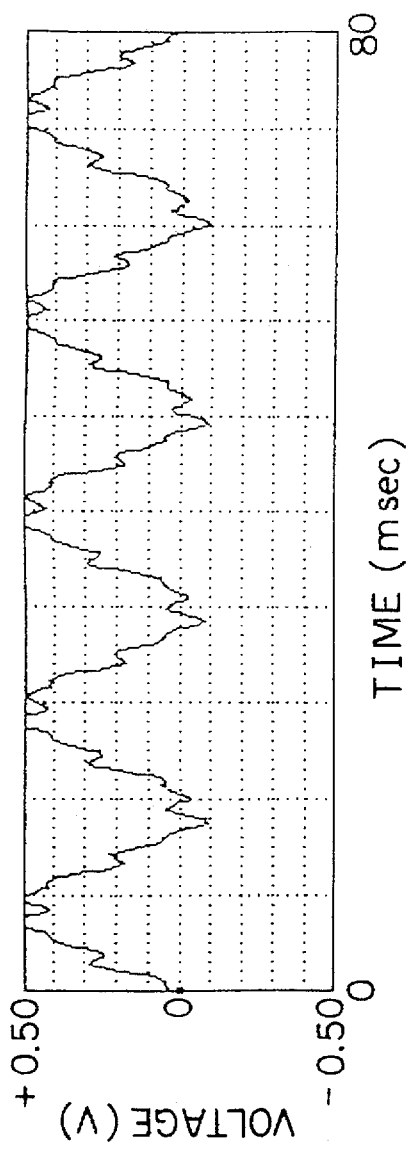
FIG. 2A is a waveform diagram of an alternating current containing waveform distortion produced by a semiconductor switching circuit using steep front wave thyristors.

FIG. 2A is a waveform diagram of the current passing through the semiconductor switching circuit 6 in the case that the inductor 3 is not serially connected to the semiconductor switching circuit 6. In other words, in this example, the semiconductor switching circuit 6 with the steep front wave thyristors is directly connected to the power source 10. This waveform diagram is obtained by connecting a series resistor for measuring replacement for a cable 64 between the terminals 6A and 4 of the semiconductor switching circuit 6, and measuring the voltage across the resistor. In the waveform diagram in FIG. 2A, an average level of the waveform is not zero, but shifted to a positive voltage value. A direct current is generated in the power line connected to the semiconductor switching circuit 6 by induction from other electric apparatus positioned adjacent to it. The above-mentioned level shift is caused by passing of the direct current through the resistor.

Figure 2B:
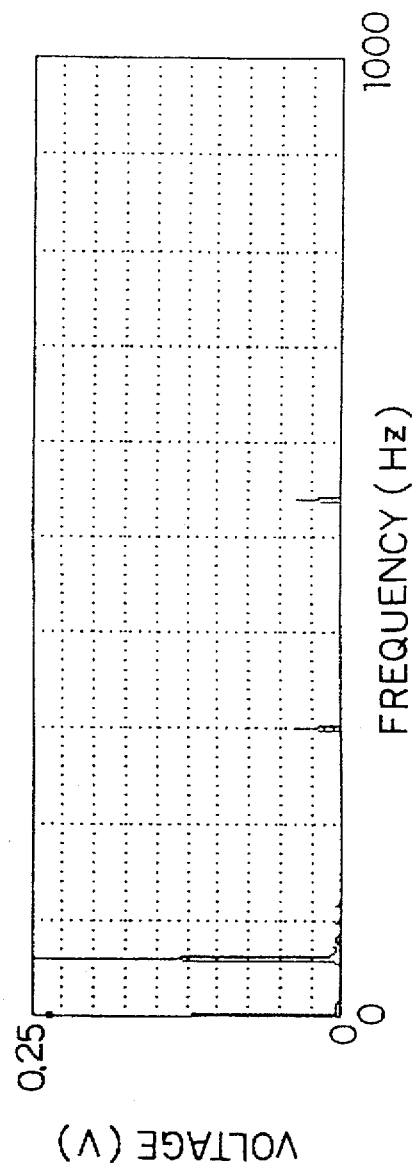
FIG. 2B is a diagram of frequency spectral distribution of the alternating current in FIG. 2A.
Figure 4:
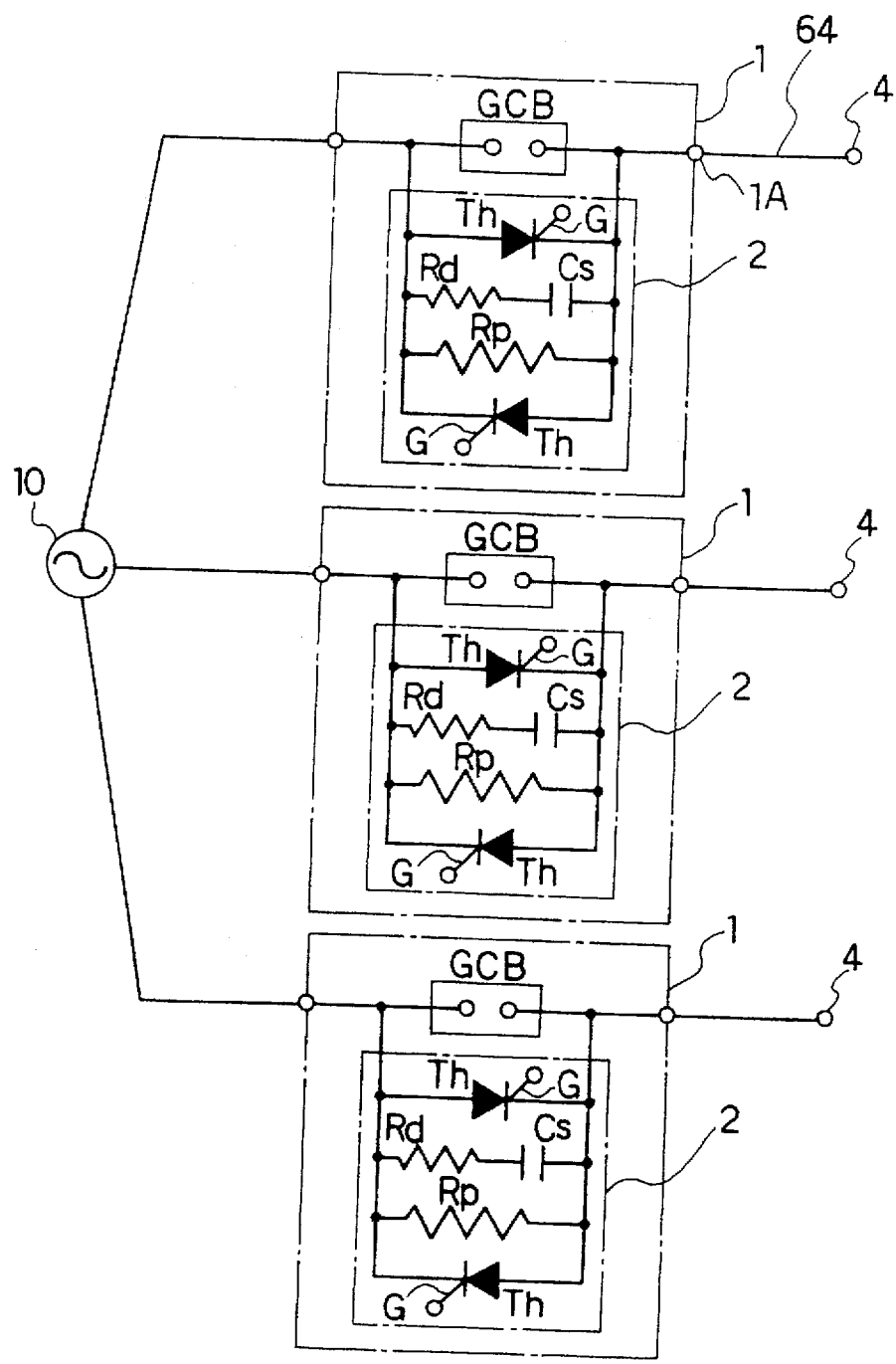
FIG. 4 is a circuit of the power line instant switching apparatus of the prior art.

FIG. 2B shows a frequency-spectral distribution in the waveform of FIG. 2A. As shown in FIG. 2B, a fifth harmonic wave of about 0.038V of about 15% of the fundamental wave voltage 0.25V and a ninth harmonic of a similar voltage to the fifth harmonic wave are superimposed on the fundamental wave of alternating current of 60 Hz. In comparison with the frequency-spectral distribution of the semiconductor switching circuit 2 using the conventional thyristor Th shown in FIG. 5B, the voltages of the fifth and the ninth harmonic waves are about 34% of the conventional fundamental wave voltage 0.25V shown in FIG. 5B.

Figure 5A:
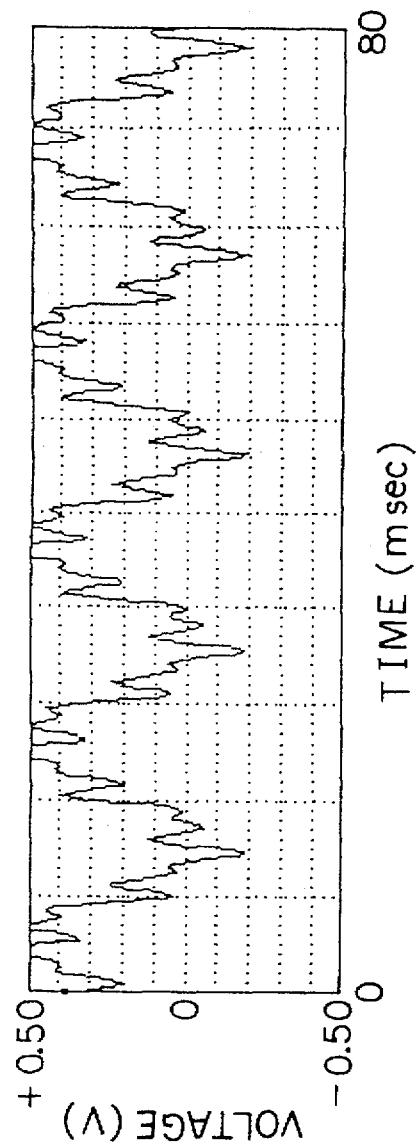
FIG. 5A is the waveform diagram of the alternating current containing waveform distortion in the semiconductor switching circuit which is used for the power line instant switching apparatus in the prior art.

On the other hand, in the semiconductor switching circuit 6 using the steep front wave thyristors Ths, as shown in FIG. 2B, both voltages of the fifth and the ninth harmonics are about 15% of the fundamental wave voltage 0.25V and decrease to about one-half of the above-mentioned 34%. Consequently, it represents a great decrease of the waveform distortion. When the waveform shown in FIG. 2A is compared with the waveform as shown in FIG. 5A of the prior art, it is recognized that the waveform in FIG. 2A is improved to have less ruggedness than the conventional waveform in FIG. 5A. And the waveform distortion is reduced.

FIG. 3A is a waveform diagram of current passing through the semiconductor switching circuit 6 using the steep front wave thyristors Ths of the embodiment shown in FIG. 1 wherein the inductor 3 is connected in series between the power source 10 and the semiconductor switching circuit 6.

The measurement method of the waveform diagram of FIG. 3A is identical with that of FIG. 2A. The reason why an average level of the waveform is not zero but shifted to a negative voltage value is described below.

A direct current which is inverse to that in the case of FIG. 2A is generated in the power line connected to the semiconductor switching circuit 6 by induction from other electric apparatus positioned adjacent to it. The direct current passes through the resistor and causes the level shift.

FIG. 3B shows frequency-spectral distribution of the waveform as shown in FIG. 3A. Referring to FIG. 3B, a fifth harmonic of about 0.1V of about 10% of a fundamental wave voltage 1V and a ninth harmonic wave of about 0.02V of about 2% thereof are superimposed on the fundamental wave. It is recognized by comparing FIG. 3A with FIG. 2A that a waveform distortion in the present embodiment is greatly reduced. It shows that the harmonic waves greatly decrease by connecting in series the inductor 3 between the power source 10 and the semiconductor switching circuit 6.

By comparison of the waveform of FIG. 3A with the waveform of FIG. 5A of the conventional semiconductor switching circuit 2, it is recognized that the waveform of FIG. 3A is greatly improved in ruggedness in comparison the with waveform in FIG. 5A and the waveform distortion is also greatly reduced.

Figure 5B:
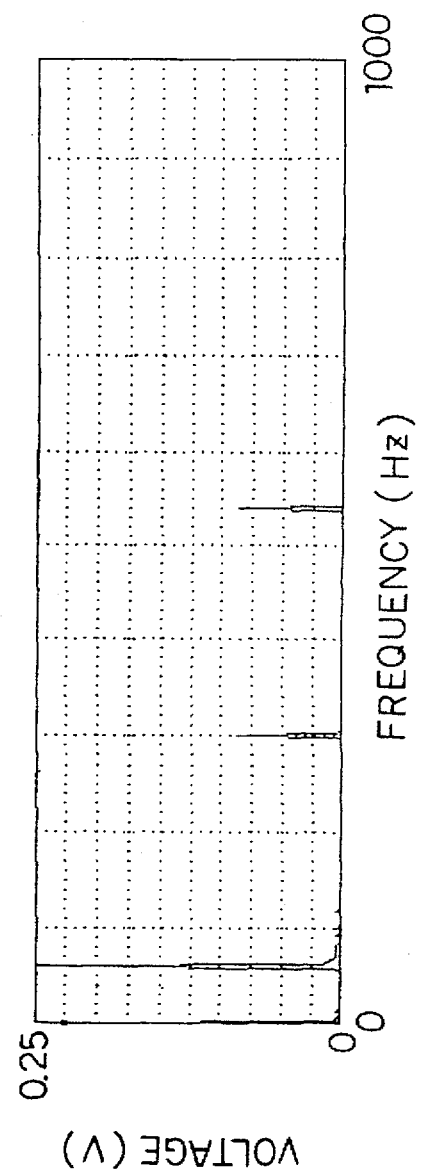
FIG. 5B is a diagram of frequency spectral distribution of the alternating of FIG. 5A containing the above-mentioned waveform distortion.

Furthermore, comparison of the spectral distribution diagram in FIG. 3B with that in FIG. 5B of the conventional semiconductor switching circuit 2 shows that the fifth harmonic is reduced to about one-third, from about 34% of the fundamental wave voltage shown in FIG. 5B to about 10% of the fundamental wave voltage shown in FIG. 3B. Moreover, the ninth harmonic wave is reduced to about 2% from about 34% shown in FIG. 5B, that is one seventeenth of that shown in FIG. 3B.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A power line switching apparatus comprising:
   a semiconductor switching circuit having at least one pair of steep front wave thyristors connected in parallel and inverse in their forward direction with each other, an instant disconnection time of said semiconductor switching circuit being 100 to 1000 microseconds,
   a snubber circuit connected in parallel with said at least one pair of parallel-connected steep front wave thyristors, and
   an inductor serially connected to said at least one pair of parallel-connected steep front wave thyristors, wherein the steep front wave thyristors substantially decrease harmonic waves in a frequency spectral distribution.

2. The power line switching apparatus in accordance with claim 1, wherein an inductance of said inductor is 20 mH to 600 mH.

3. The power line switching apparatus of claim 1 wherein the snubber circuit comprises a pair of zener diodes connected in series and inverse with respect to each other.

4. The power line switching apparatus of claim 3 wherein the snubber circuit further comprises a resistor connected in parallel with the pair of zener diodes.

5. The power line switching apparatus of claim 1 wherein the thyristors are constructed using a semiconductor material having a predetermined lattice defect produced by a proton irradiation process.

6. The power line switching apparatus of claim 5 wherein the proton irradiation process uses about 10 Mev of acceleration voltage.

7. The power line switching apparatus of claim 1 wherein the steep front wave thyristors substantially decrease a voltage of the fifth and ninth harmonic waves.

* * * * *